(12) United States Patent
Chiu et al.

(10) Patent No.: US 8,789,754 B2
(45) Date of Patent: Jul. 29, 2014

(54) ELECTRONIC DEVICE AND PROTECTION MECHANISM THEREOF

(75) Inventors: Yi-Yuan Chiu, Taipei County (TW); Yu-Tsung Chen, Taipei County (TW); Shu-Hua Chiang, Taipei County (TW); Chien-Hung Liu, Taipei County (TW)

(73) Assignee: Uniform Industrial Corp., Taipei Hsien (TW)

( * ) Notice: Subject to any disclaimer, the term of this patent is extended or adjusted under 35 U.S.C. 154(b) by 551 days.

(21) Appl. No.: 12/884,790

(22) Filed: Sep. 17, 2010

(65) Prior Publication Data

US 2011/0240737 A1    Oct. 6, 2011

(30) Foreign Application Priority Data

Mar. 31, 2010    (TW) .............................. 99205699 U

(51) Int. Cl.
    *G06K 7/00*    (2006.01)
(52) U.S. Cl.
    USPC .......................................... 235/439; 235/435
(58) Field of Classification Search
    CPC .... G06K 7/0091; H01L 23/57; H05K 1/0275; G06F 21/86
    USPC .................. 235/449, 439, 435, 492; 257/417; 340/571; 361/654
    See application file for complete search history.

(56) References Cited

U.S. PATENT DOCUMENTS

| | | | | |
|---|---|---|---|---|
| 7,597,261 | B2 * | 10/2009 | Aviv .............................. | 235/449 |
| 7,880,248 | B1 * | 2/2011 | Pham et al. .................... | 257/417 |
| 7,898,413 | B2 * | 3/2011 | Hsu et al. ...................... | 340/571 |
| 2004/0120101 | A1 * | 6/2004 | Cohen et al. .................. | 361/654 |

\* cited by examiner

*Primary Examiner* — Thien T Mai
(74) *Attorney, Agent, or Firm* — Muncy, Geissler, Olds & Lowe, P.C.

(57) ABSTRACT

An electronic device includes a protection mechanism, a first circuit board having a first electronic loop, and a second circuit board having a second electronic loop. The protection mechanism is disposed between the first circuit board and the second circuit board, and includes a frame and a first flexible board. The first flexible board includes a first connector, and a first wire mesh used for forming a third electronic loop. When trace breaking occurs to any one, any two, or all of the electronic loops, the first, the second, and the third electronic loops are forced to break, thereby protecting data saved in the electronic device from being read inappropriately, so as to avoid data to be stolen.

20 Claims, 5 Drawing Sheets

ELECTRONIC DEVICE AND PROTECTION MECHANISM THEREOF

CROSS-REFERENCES TO RELATED APPLICATIONS

This non-provisional application claims priority under 35 U.S.C. §119(a) on Patent Application No. 99205699 filed in Taiwan, R.O.C. on 2010 Mar. 31, the entire contents of which are hereby incorporated by reference.

BACKGROUND OF THE INVENTION

1. Technical Field

The present invention relates to an electronic device, and more particularly to an electronic device having a protection mechanism.

2. Related Art

Using a credit card is both quick and convenient, due to its advantage of enabling buying now and paying later. However, with the increasing popularization of the credit card, the threats to personal credit data security are also rising continuously; most commonly, the credit card data is stolen and used illegally to make a fake card, resulting in credit card data theft becoming a social problem in urgent need of solutions, so as to avoid financial losses and financial order disturbance.

SUMMARY

Accordingly, the present invention provides a protection mechanism of an electronic device, which is disposed between a first circuit board and a second circuit board. The first circuit board includes a first electronic loop, and the second circuit board includes a second electronic loop. The protection mechanism includes a frame and a first flexible board. The first flexible board is attached on an inner surface of the frame, and includes a first connector connected electrically to the first circuit board or the second circuit board, and a first wire mesh used for forming a third electronic loop. When trace breaking occurs to the first electronic loop, the second electronic loop, or the third electronic loop, the first, the second, and the third electronic loops are forced to break.

The present invention also provides an electronic device, which includes a case; a first circuit board, located in the case, and including a first electronic loop; a second circuit board, located in the case, disposed opposite to the first circuit board, and including a second electronic loop; a frame, located between the first circuit board and the second circuit board, having one end face attached closely to the first circuit board, and the other end face attached closely to the second circuit board; and a first flexible board, attached on an inner surface of the frame, including a first connector connected electrically to the first circuit board or the second circuit board, and a first wire mesh used for forming a third electronic loop, in which when trace breaking occurs to any one, any two, or all of the first wire mesh, the first electronic loop, and the second electronic loop, the first, the second, and the third electronic loops are forced to break.

The protection mechanism of the electronic device according to the present invention may be applied to card readers capable of reading various bar code type, magnetic strip type, or chip type fiscards, credit cards, or personal electronic identity cards. When the card reader is damaged by an inappropriate external force and data stored in the card reader is to be read, the electronic loops of the electronic device can detect hacker's attack once they are broken or losing electrical contact, and the electronic device is driven to halt all of functions for preventing data from stealing by hacker.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
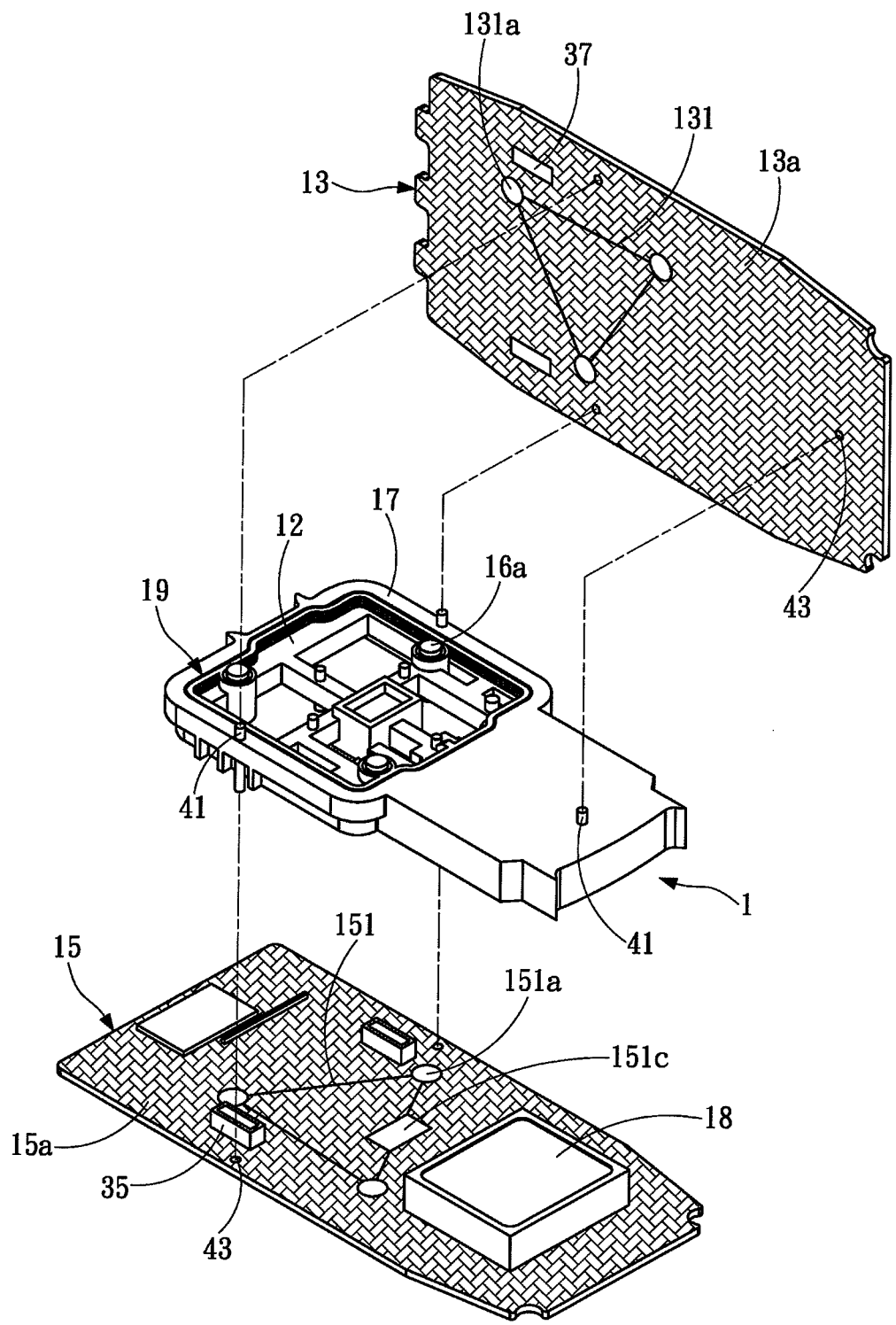
FIG. 1 is a schematic outside view of a protection mechanism, a first circuit board, and a second circuit board of an electronic device according to a first embodiment of the present invention.
Figure 2A:
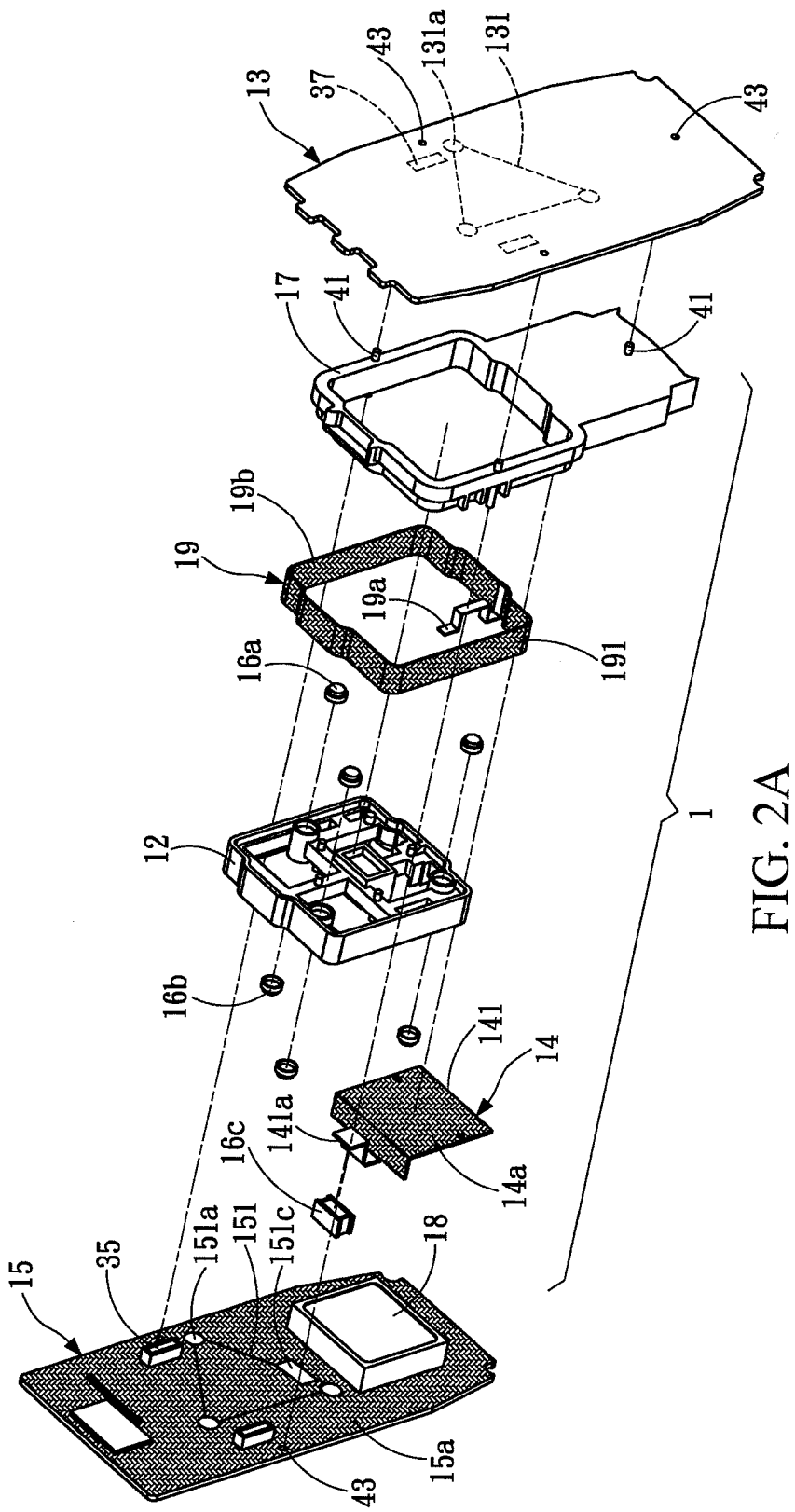
FIGS. 2A and 2B are schematic exploded views of the protection mechanism, the first circuit board, and the second circuit board of the electronic device according to the first embodiment of the present invention, in which a first electrical conductor and a second electrical conductor are disposed independently.
Figure 2B:
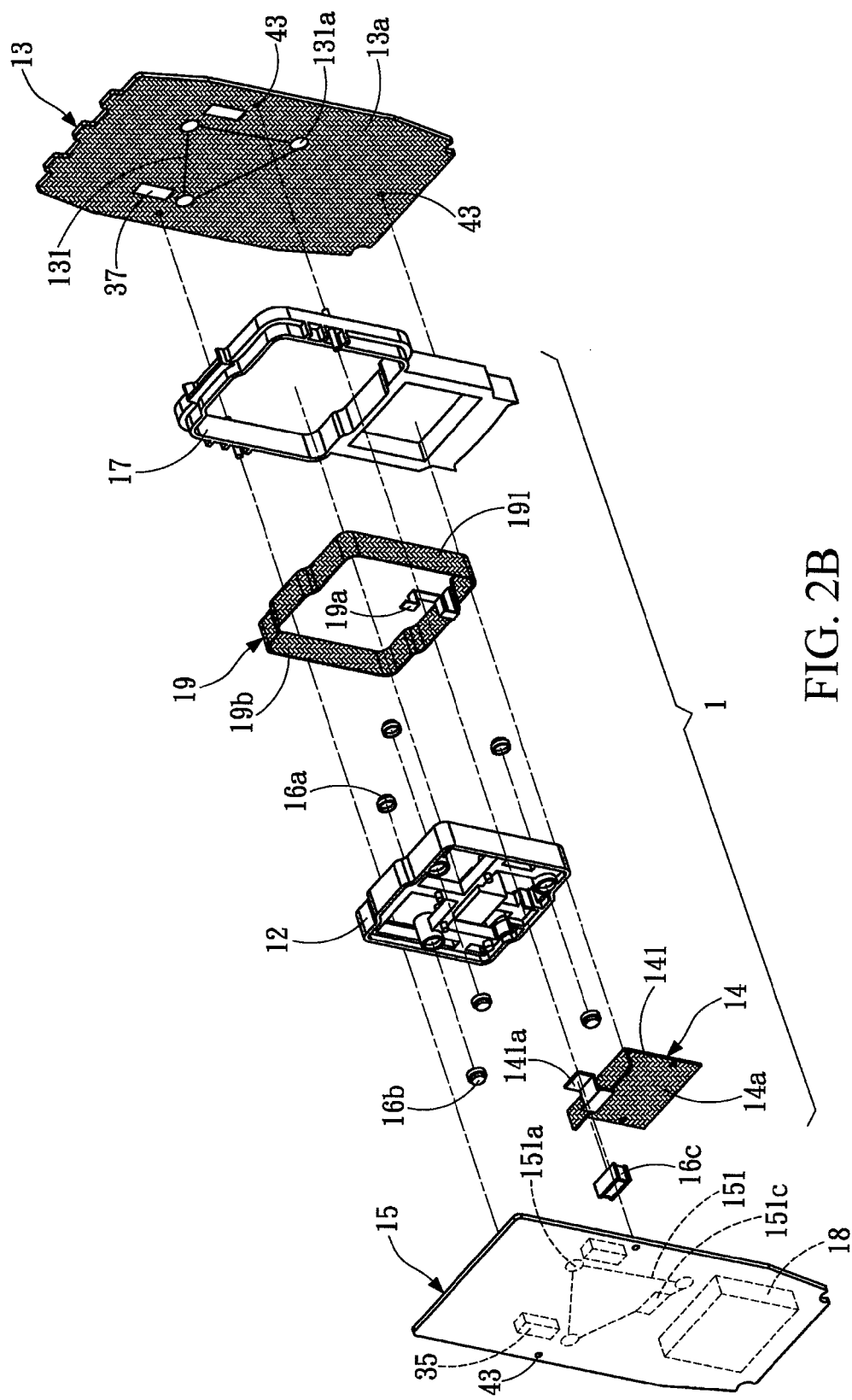

FIGS. 1, 2A, and 2B are a protection mechanism 1 of an electronic device according to a first embodiment of the present invention. The protection mechanism 1 is disposed between a first circuit board 13 and a second circuit board 15, and includes a frame 17, a first flexible board 19, a bracket 12, a second flexible board 14, a first electrical conductor 16a, a second electrical conductor 16b, and a third electrical conductor 16c. The protection mechanism 1 is used for protecting data saved in the electronic device, so as to prevent the data from being read inappropriately, thereby avoiding data to be stolen. The number of the first electrical conductor 16a and the number of the second electrical conductor 16b may be one or more, and the present invention is not limited thereto.

The first circuit board 13 includes a first electronic loop 131 having a first conductive contact 131a, and the first electronic loop 131 is preferably formed by a third wire mesh 13a.

The second circuit board 15 is disposed opposite to the first circuit board 13, and includes a second electronic loop 151 having a second conductive contact 151a and a fifth conductive contact 151c, in which the second electronic loop 151 is preferably formed by a fourth wire mesh 15a.

In addition, the first circuit board 13 and the second circuit board 15 preferably include a second connector 35 and a third connector 37, respectively. The second connector 35 is connected to the third connector 37, such that the first circuit board 13 is connected electrically to the second circuit board 15.

The frame 17 has one end face attached closely to the first circuit board 13, and the other end face attached closely to the second circuit board 15. A material of the frame 17 is preferably a plastic material, which is only exemplary herein, and the present invention is not limited thereto.

The first flexible board 19 is attached on an inner surface of the frame 17, and includes a first connector 19a and a first wire mesh 19b. The first connector 19a is connected electrically to the first circuit board 13 or the second circuit board 15. The first wire mesh 19b is used for forming a third electronic loop 191. When trace breaking occurs to the first electronic loop 131, the second electronic loop 151, or the third electronic loop 191, the first electronic loop 131, the second electronic loop 151, and the third electronic loop 191 are forced to break.

The bracket 12 is used for supporting the first flexible board 19 on the inner surface of the frame 17, and for the purpose of mounting the first electrical conductor 16a, the second electrical conductor 16b.

The second flexible board 14 includes a second wire mesh 14a for forming a fourth electronic loop 141, and a third conductive contact 141a.

The first electrical conductor 16a and the second electrical conductor 16b are oppositely disposed on the bracket 12 and are electrically isolated from each other. The first electrical conductor 16a is connected electrically to the first conductive contact 131a, and the second electrical conductor 16b is connected electrically to the second conductive contact 151a, so as to independently electrically conduct the first electronic loop 131 and the second electronic loop 151, respectively. The number of the first electrical conductor 16a and the number of the second electrical conductor 16b may be one or more, and the present invention is not limited thereto.

The third electrical conductor 16c has two ends respectively connected electrically to the third conductive contact 141a and the fifth conductive contact 151c of the second circuit board. When trace breaking occurs to the second wire mesh 14a, the fourth electronic loop 141 and the second electronic loop 151 are forced to break. The first circuit board 13 or the second circuit board 15 is connected electrically to a socket 18, used for reading and storing data. When the electronic loops are broken, the socket is driven to be broken and loses data. The socket 18 preferably includes a data storage element, a micro-processing element, or a chip/magnetic card reading element, which is only exemplary herein, and the present invention is not limited thereto. Here, the data storage element may be any form of a memory card or card reader connector, or may be a Flash memory chip, and the present invention is not limited thereto.

In a preferred example of this embodiment, the frame 17 includes engaging parts 41, and the first circuit board 13 and the second circuit board 15 further include engaging slots 43. The engaging parts 41 are engaged with the engaging slots 43, such that the frame 17, the first circuit board 13, and the second circuit board 15 are positioned and connected to one another.

Figure 2C:
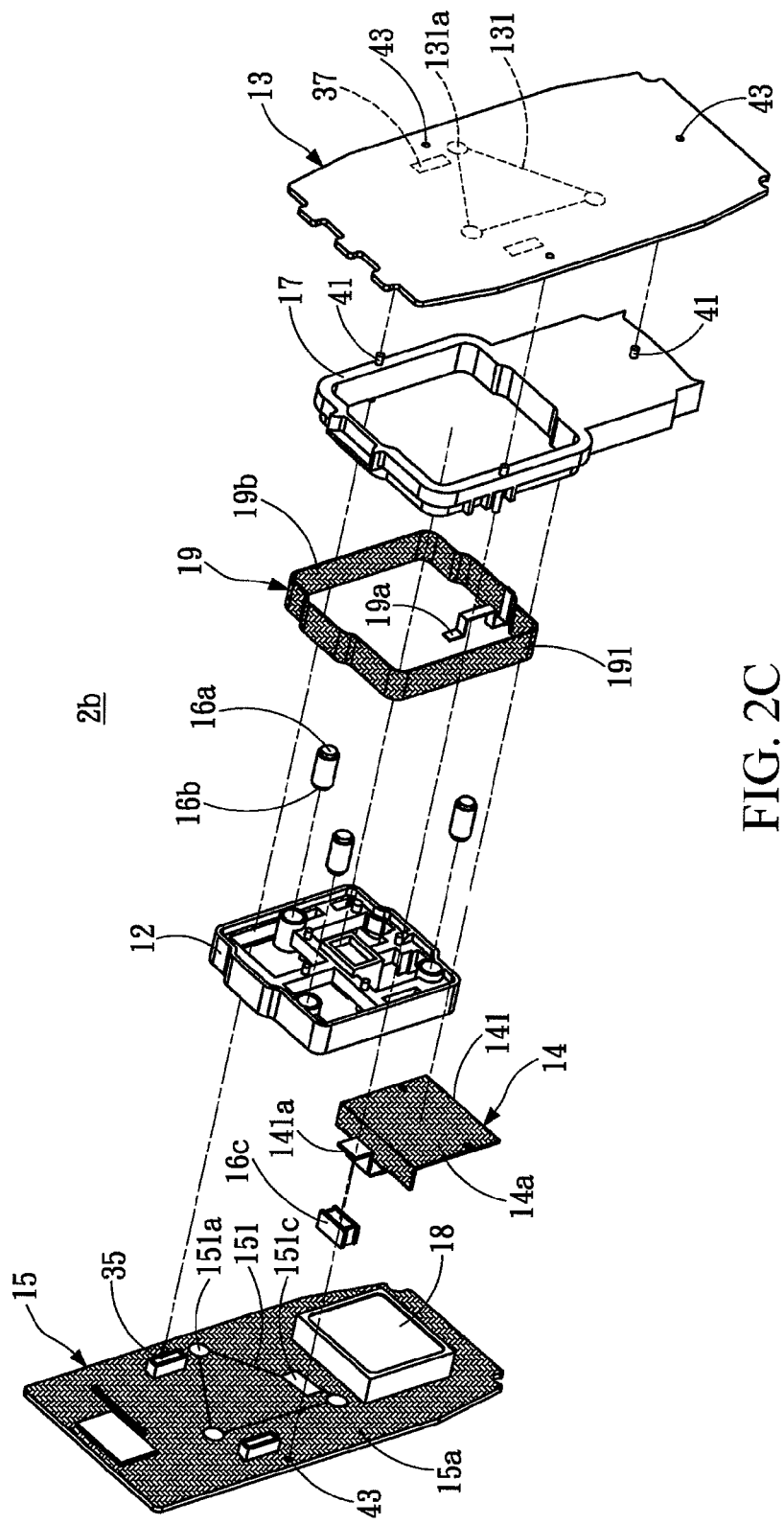
FIG. 2C is a schematic exploded view of a protection mechanism, a first circuit board, and a second circuit board of an electronic device according to a second embodiment of the present invention, in which a first electrical conductor and a second electrical conductor are formed integrally.
Figure 3:
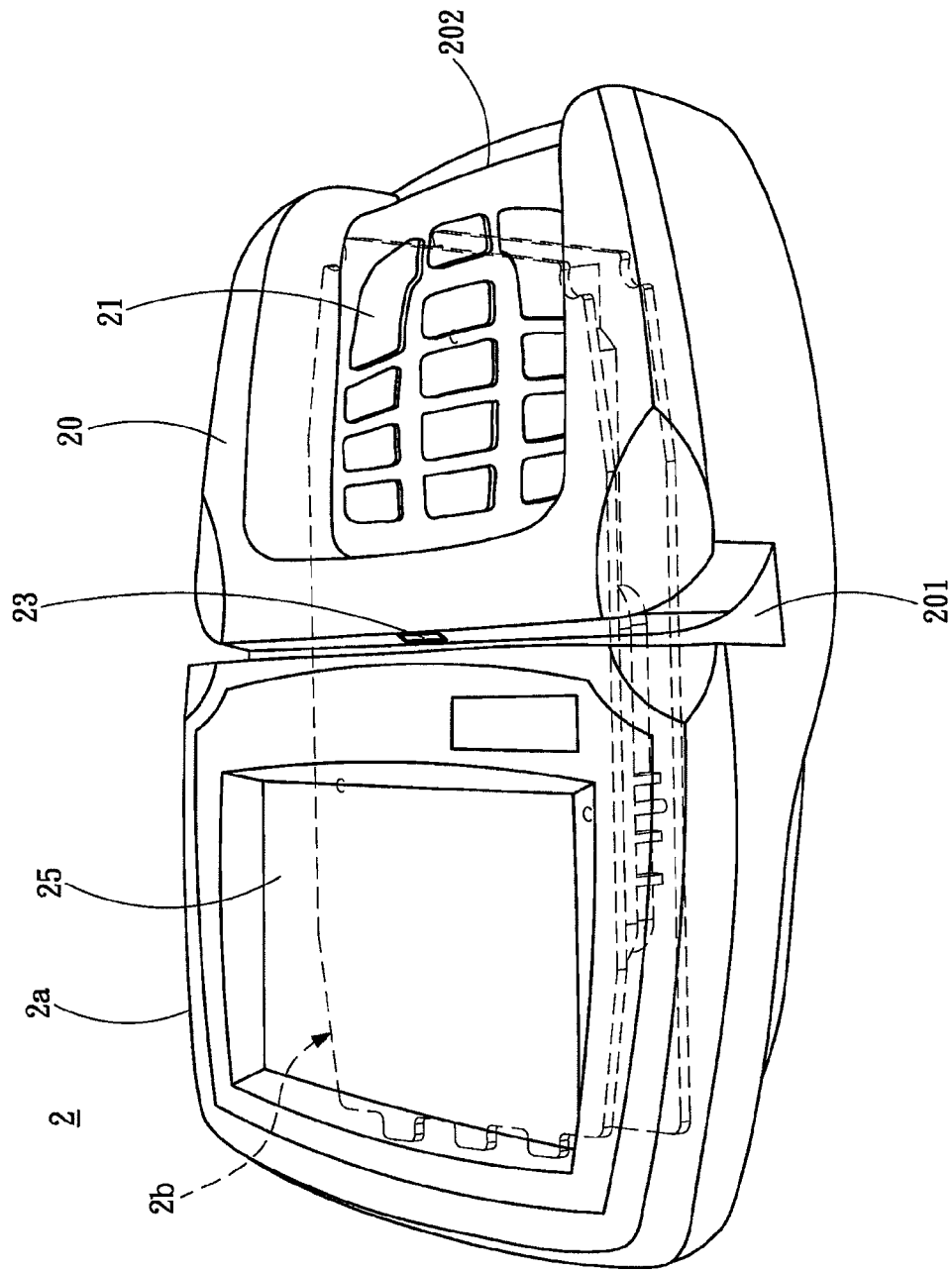
FIG. 3 is a schematic outside view of the electronic device according to the second embodiment of the present invention.

FIGS. 2C and 3 are an electronic device 2 according to a second embodiment of the present invention. The electronic device 2 includes an external module 2a, which includes a case 20 and a socket 18, and an internal module 2b, which includes a first circuit board 13, a second circuit board 15, a frame 17, and a first flexible board 19. The electronic device 2 has the function of protecting data from being read inappropriately, thereby avoiding data to be stolen.

The case 20 is used for accommodating the internal module 2b, and is preferably made of acrylonitrile butadiene styrene (ABS) plastics, carbon fiber-reinforced plastics (CFRP), super-elastic polycarbonate (SEPC), glass fiber reinforced plastics (GFRP), or Magnesium alloy. The aforementioned structure and material of the case 20 are only exemplary herein, and the present invention is not limited thereto.

The first circuit board 13 is located in the case 20, and includes a first electronic loop 131 having a first conductive contact 131a, in which the first electronic loop 131 is preferably formed by a third wire mesh 13a.

The second circuit board 15 is located in the case 20 and disposed opposite to the first circuit board 13, and includes a second electronic loop 151 having a second conductive contact 151a and a fifth conductive contact 151c, in which the second electronic loop 151 is preferably formed by a fourth wire mesh 15a.

In addition, the first circuit board 13 and the second circuit board 15 preferably include a second connector 35 and a third connector 37, respectively. The second connector 35 is connected to the third connector 37, such that the first circuit board 13 is connected electrically to the second circuit board 15.

The frame 17 has one end face attached closely to the first circuit board 13, and the other end face attached closely to the second circuit board 15.

The socket 18 is connected electrically to the second circuit board 15 and used for reading and storing data. The socket 18 preferably includes a data storage element, a micro-processing element, or a chip/magnetic card reading element, which is only exemplary herein, and the present invention is not limited thereto. Here, the data storage element may be any form of a memory card or card reader connector, or may be a Flash memory chip, and the present invention is not limited thereto.

The first flexible board 19 is attached on an inner surface of the frame 17, and includes a first connector 19a and a first wire mesh 19b. The first connector 19a is connected electrically to the first circuit board 13 or the second circuit board 15. The first wire mesh 19b is used for forming a third electronic loop 191. When trace breaking occurs to any one, any two, or all of the first electronic loop 131, the second electronic loop 151, and the third electronic loop 191, the first electronic loop 131, the second electronic loop 151, and the third electronic loop 191 are forced to break, the socket 18 is driven to be broken and loses data.

In a first preferred example of this embodiment, the internal module 2b further includes a bracket 12, a second flexible board 14, a first electrical conductor 16a, a second electrical conductor 16b, and a third electrical conductor 16c. The electrical conductors (16a, 16b, and 16c) preferably include a conductive rubber, which is only exemplary herein, and the present invention is not limited thereto.

The bracket 12 is used for supporting the first flexible board 19 on the inner surface of the frame 17.

The second flexible board 14 includes a second wire mesh 14a for forming a fourth electronic loop 141, and a third conductive contact 141a.

The first electrical conductor 16a and the second electrical conductor 16b are oppositely disposed on the bracket 12 and are electrically isolated from each other. The first electrical conductor 16a is connected electrically to the first conductive contact 131a, and the second electrical conductor 16b is connected electrically to the second conductive contact 151a, so as to independently electrically conduct the first electronic loop 131 and the second electronic loop 151, respectively.

In addition, the first electrical conductor 16a and the second electrical conductor 16b are preferably disposed independently on the bracket 12, as shown in FIGS. 2A and 2B, or are formed integrally on the bracket 12, as shown in FIG. 2C.

The third electrical conductor 16c has two ends respectively connected electrically to the third conductive contact 141a and the fifth conductive contact 151c of the second circuit board. When trace breaking occurs to the second wire mesh 14a, the fourth electronic loop 141 and the second electronic loop 151 are forced to break.

In a second preferred example of this embodiment, the external module 2a of the electronic device 2 further includes an input element 21a display element 25, and the socket 18 including a reading element 23. The electronic device 2 is preferably a card reader of any type.

The input element 21 is disposed in the case 20, and is used for writing data to the socket 18 or any internal storage elements of the protection mechanism 1 (that is, storage elements in a protection region enclosed by the first circuit board 13, the second circuit board 15, and the first flexible board 19, not shown), in which the input element 21 is preferably a keyboard. The above description is only exemplary herein, and the present invention is not limited thereto.

The reading element 23 is disposed in a slot 201 of the case 20, and is used for reading data of a start medium (not shown). A user inserts the start medium (for example, a magnetic card or a chip card) or swipes the start medium through the slot 201, and the reading element 23 senses and reads data off the start medium.

The display element 25 is used for displaying input information and data off the start medium (not shown).

The start medium may be a fiscard, a credit card, or a personal electronic identity card, and may be of a bar code type, a magnetic strip type, or a chip type. In addition, the start medium of the chip type may be classified as a contact chip or a non-contact chip.

The start medium is preferably a contact chip. The contact chip is inserted in a slot 202, and the data is output. The above description is only exemplary herein, and the present invention is not limited thereto.

In a third preferred example of this embodiment, the electronic device 2 is a credit card reader, and the electronic device 2 further includes a printing device (not shown) for printing consumer bills.

Accordingly, the protection mechanism of the electronic device according to the present invention may be applied to various types of card readers. When the card reader is damaged by an inappropriate external force and data stored in the card reader is to be read, the protection mechanism can protect the data saved in the electronic device through the following means.

(1) When the frame is damaged by an external force, and trace breaking occurs to one of the first wire mesh of the first flexible board, the first electronic loop, and the second electronic loop, the first, the second, the third electronic loops are forced to break, and the electronic device is triggered and driven to be paralyzed to avoid attacker's further stealing of customer's transaction data.

(2) When trace breaking occurs to the second flexible board, the fourth electronic loop and the second electronic loop are forced to break, and the electronic device is triggered and driven to be paralyzed, and cannot be operated.

(3) When the protection mechanism is disassembled, the first electrical conductor and the second electrical conductor cannot be connected electrically to the first conductive contact and the second conductive contact, such that the first electronic loop and the second electronic loop cannot be electrically conducted from the loose contact.

In view of the above, when any one of the electronic loops is broken, the socket is broken, and the data cannot be read, so as to avoid data to be stolen and illegal forgery with the data, thereby preventing losses caused by stolen data.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A protection mechanism of an electronic device, disposed between a first circuit board and a second circuit board, wherein the first circuit board comprises a first electronic loop, and the second circuit board comprises a second electronic loop, the protection mechanism comprising:
   a frame, located, between the first circuit board and the second circuit board, having one end face attached closely to the first circuit board, the other end face attached closely to the second circuit board, and comprising a ring hole; and
   a ring-shaped first flexible board, disposed in the ring hole, attached on an inner surface of the frame around the inner periphery of the ring hole, and comprising:
      a first connector, connected electrically to the first circuit board or the second circuit board; and
      a first wire mesh, for forming a third electronic loop on the first circuit board, wherein when trace breaking occurs to the first electronic loop, the second electronic loop, or the third electronic loop, the electronic loops are forced to break.

2. The protection mechanism according to claim 1, further comprising a bracket, for supporting the first flexible board on the inner surface of the frame.

3. The protection mechanism according to claim 2, further comprising a first electrical conductor and a second electrical conductor oppositely disposed on the bracket and electrically isolated from each other, wherein the first electronic loop comprises a first conductive contact, the second electronic loop comprises a second conductive contact and a fifth conductive contact, and the first electrical conductor and the second electrical conductor are respectively connected electrically to the first conductive contact and the second conductive contact, so as to electrically conduct the first electronic loop and the second electronic loop.

4. The protection mechanism according to claim 3, wherein the first electrical conductor and the second electrical conductor are disposed independently on the bracket.

5. The protection mechanism according to claim 3, wherein the first electrical conductor and the second electrical conductor are formed integrally on the bracket.

6. The protection mechanism according to claim 3, further comprising:
   a second flexible board, comprising a second wire mesh for forming a fourth electronic loop, and a third conductive contact; and
   a third electrical conductor, having two ends respectively connected electrically to the third conductive contact and the fifth conductive contact, wherein when trace breaking occurs to the second wire mesh, the second electronic loop and the fourth electronic loop are forced to break.

7. The protection mechanism according to claim 6, further comprising a socket disposed between the first circuit board and the second circuit board.

8. The protection mechanism according to claim 1, wherein the first circuit board comprises a second connector, the second circuit board comprises a third connector, and the second connector and the third connector are connected electrically between the circuit boards.

9. The protection mechanism according to claim 1, wherein the first electronic loop is formed by a third wire mesh, and the second electronic loop is formed by a fourth wire mesh.

10. An electronic device, comprising:
a case;
a first circuit board, comprising a first electronic loop, and located in the case;
a second circuit board, disposed opposite to the first circuit board, comprising a second electronic loop, and located in the case;
a frame, located between the first circuit board and the second circuit board, having one end face attached closely to the first circuit board, the other end face attached closely to the second circuit board, and comprising a ring hole; and
a ring-shaped first flexible board, disposed in the ring hole, attached on an inner surface of the frame around the inner periphery of the ring hole, and comprising:
a first connector, connected electrically to the first circuit board or the second circuit board; and
a first wire mesh, for forming a third electronic loop on the first circuit board, wherein when trace breaking occurs to the first electronic loop, the second electronic loop, or the third electronic loop, the electronic loops are forced to break.

11. The electronic device according to claim 10, further comprising a bracket, for supporting the first flexible board on the inner surface of the frame.

12. The electronic device according to claim 11, further comprising a first electrical conductor and a second electrical conductor oppositely disposed on the bracket and electrically isolated from each other, wherein the first electronic loop comprises a first conductive contact, the second electronic loop comprises a second conductive contact and a fifth conductive contact, and the first electrical conductor and the second electrical conductor are respectively connected electrically to the first conductive contact and the second conductive contact, so as to electrically conduct the first electronic loop and the second electronic loop.

13. The electronic device according to claim 12, wherein the first electrical conductor and the second electrical conductor are disposed independently on the bracket.

14. The electronic device, according to claim 12, wherein the first electrical conductor and the second electrical conductor are formed integrally on the bracket.

15. The electronic device according to claim 12, further comprising:
a second flexible board, comprising a second wire mesh for forming a fourth electronic loop, and a third conductive contact; and
a third electrical conductor, having two ends respectively connected electrically to the third conductive contact and the fifth conductive contact, wherein when trace breaking occurs to the second wire mesh, the second electronic loop and the fourth electronic loop are forced to break.

16. The electronic device according to claim 15, further comprising a socket disposed between the first circuit board and the second circuit board.

17. The electronic device according to claim 10, wherein the first circuit board comprises a second connector, the second circuit board comprises a third connector, and the second connector and the third connector are connected electrically between the circuit boards.

18. The electronic device according to claim 16, further comprising an input element, disposed in the case.

19. The electronic device according to claim 16, wherein the socket comprises a reading element, disposed in the case, and used fir reading data of a start medium, wherein the start medium is a fiscard, a credit card, or a personal electronic identity card.

20. The electronic device according to claim 10, wherein the first electronic loop is formed by a third wire mesh, and the second electronic loop is formed by a fourth wire mesh.

* * * * *